Aug. 19, 1941.     A. LESAGE     2,252,774
HUB BRAKE MECHANISM
Filed July 29, 1939     2 Sheets-Sheet 1
Fig. 1.
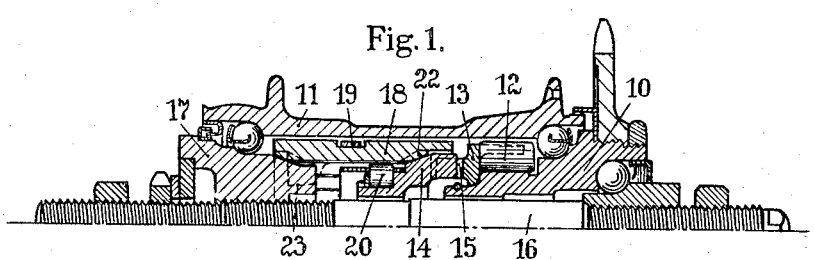
Fig. 4.
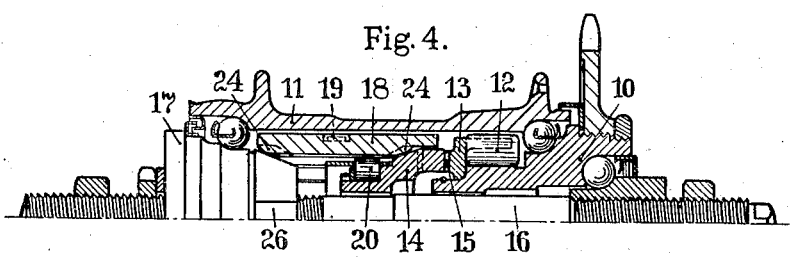
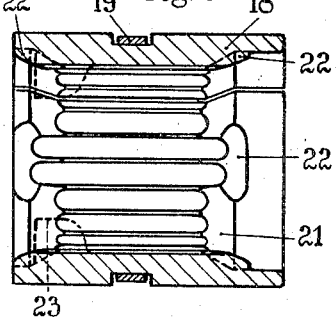
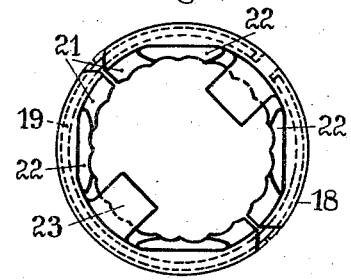
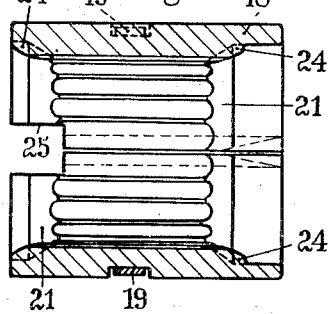
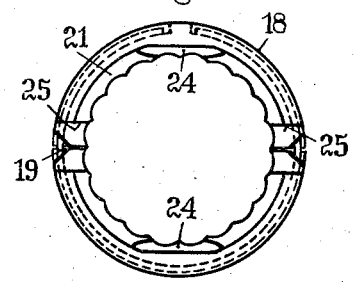
Inventor
Alfred Lesage
per
Dean Fairbank & Hirsch

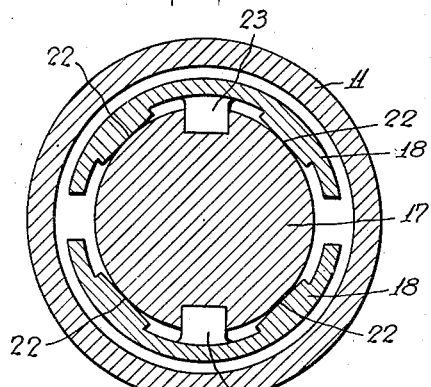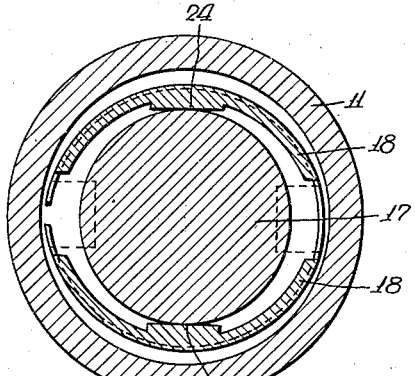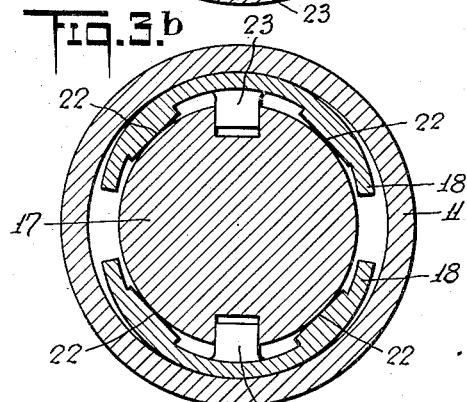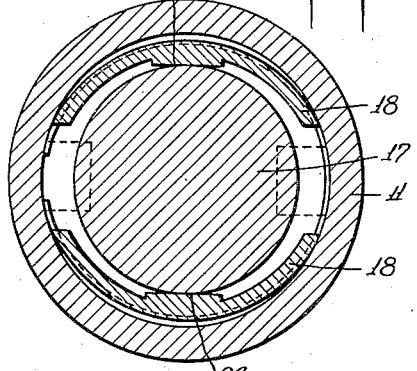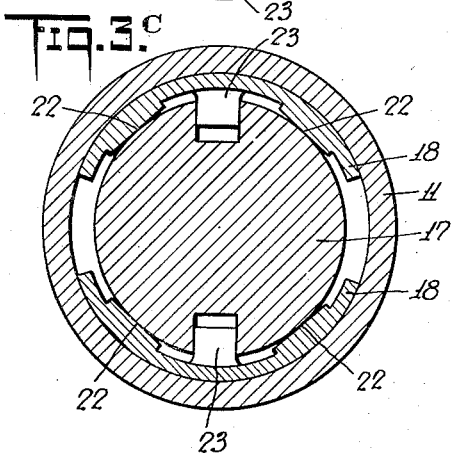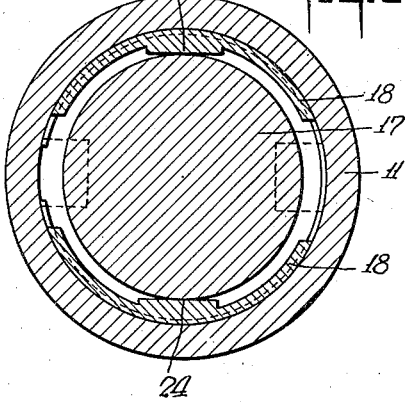

Patented Aug. 19, 1941

2,252,774

UNITED STATES PATENT OFFICE 2,252,774

HUB BRAKE MECHANISM

Alfred Lesage, Schweinfurt, Germany

Application July 29, 1939, Serial No. 287,340
In Germany August 13, 1938

6 Claims. (Cl. 192—6)

The present invention relates to a segmental sleeve-like brake body, particularly adapted for free wheel brake hubs provided with interior hub brakes, the jaws of said brake body being directly pressed against the inner surface of the hub sleeve by cone shaped spreading members entering the ends of the brake body.

The invention substantially is characterized in that the cylinder sectors, forming the brake body, bear upon the spreading cones by wedge surfaces provided in their ends and that by means of such spreading cones the portions of the jaws situated laterally of the points of contact are resiliently pressed against the counter-brake surface.

During braking the wedge faces of the brake body sectors bear against the spreading cones along a generating line, so that freely supported portions of these sectors which substantially are moved radially away from each other are formed at both sides of the line of contact. These freely supported portions readily and easily conform to the inner surface of the hub sleeve, because, even though their resilient property, is only slight, they may yield inwardly so that the pressure starting from the point of spreading is distributed to both sides until the entire brake surface is in bearing contact as soon as the point of spreading is completely moved outwardly by full application of the brake. The wedge faces are relatively small so that after braking the sectors of the brake body easily slide off the spreading cones. As the radius of curvature of the cylindrical surface of the brake body sectors normally corresponds to the radius of curvature of the bore of the hub sleeve, a uniform braking and wear is obtained.

In the accompanying drawings two constructions according to the invention are shown by way of example.

In these drawings:

Fig. 1 is a longitudinal section of one half of a free wheel brake hub constructed according to the invention, Fig. 2 shows an axial section of the brake sleeve according to the first modification of the invention, Fig. 3 is an end view of the brake sleeve shown in Fig. 2, Figs. 3a, 3b and 3c are transverse sections of the brake sleeve, and show respectively progressive steps in the application of the brake in the first modification of Figs. 1 to 3, Figs. 4 to 6 show similar views of the second modification, and Figs. 6a, 6b and 6c are transverse sections of the brake sleeve, and show respectively progressive steps in the application of the brake in the second modification of Figs. 4 to 6.

The arrangement of the free wheel hub itself may be of different kind. In the examples shown, a roller locking mechanism 12 of known construction having a guide ring 13 is mounted in the hub sleeve 11 upon a driving member 10. A displaceable spreading cone member 14 may axially be shifted by means of teeth 15 provided at the end face of the spreading member and at the face of the roller guide ring 13 opposite said spreading member. Fixed upon the wheel axis 16 is a second spreading cone member 17 extending into the other end of the hub sleeve. Arranged between and upon the two spreading members is the brake sleeve 18, consisting of a plurality of parts, for instances two parts, held together by a spring ring 19. A clutch locking mechanism 20 mounted upon the spreading member 14 automatically effects connection with the brake sleeve on backwardly rotating the driving member, thereby preventing backward rotation of the spreading member 14.

As shown in Figs. 1 to 3 the ends of the brake sleeve 18 are formed substantially with hollow cone surfaces 21. The brake sleeve 18, however, does not bear upon the spreading cones by means of these hollow cone faces 21 but wedge-shaped projections 22 are formed upon the ends of said sleeve which bear against corresponding parts of the spreading cone and rise during braking. As may be seen from Fig. 3, two symmetrically arranged wedge faces 22 are provided at each of the semi-cylindrical portions, whereas between said faces 22 inwardly extending projections 23 are provided which engage a transverse slot of the spreading cone 17 thereby radially guiding the semi-cylindrical portions and preventing rotation thereof.

According to the modification shown in Figs. 4 to 6 one wedge-shaped projection 24 only is provided upon each part of the cone surfaces in the two ends of the brake sleeve. The brake sleeve in this case is held against rotation by means of recesses 25 arranged in both longitudinal sides of the brake sleeve and engaging a projection 26 on the spreading member 17.

The brake sleeve may be made of a tubular blank which afterwards is split along predetermined lines. The individual portions may, however, be obtained also by other operations, for instance by casting, spraying, extruding, or pressing. If the radius of the cylindrical surface exactly corresponds to the radius of the bore of the hub sleeve and if the jaws at the joints are so machined that they may approach each other to a certain degree, all points of the jaws during spreading bear uniformly against the inner surface of the hub sleeve as they are radially moved away from each other. If the brake body has the shape shown in Fig. 6, the main pressure is effected at the vertex of the parts. However, if the brake body has the form shown in Fig. 3, the spreading cones act upon the faces 22 laterally of the vertex and cause a lateral expansion of the parts at both sides of the projections 23 in addition to the radial movement away from each other. Therefore, a uniform pressing is obtained even if the radius is made smaller.

In Fig. 3a, the segments of the brake sleeve 18 of the first modification are shown spaced from the inner periphery of the hub sleeve 11 before the application of the brake. Upon movement of the cone members 14 and 17 axially towards each other, the segments of the brake sleeve 18 are expanded outwardly until the vertex of these sleeve segments between the two projections 22 contact the inner periphery of the hub sleeve 11, while the circumferential side sections are spaced inwardly from said inner periphery as shown in Fig. 3b. The portion of each segment of the brake sleeve between the two projections 22 is sufficiently resilient, so that upon further axial movement of the cone members 14 and 17 towards each other, said portion is flexed outwardly, to move the circumferential side portions of said segment outwardly into contact with the inner periphery of the hub sleeve 11 as shown in Fig. 3c. A uniform braking pressure is therefore obtained between the segments of the brake sleeve 18 and the hub sleeve 11, even though the outer periphery of said brake sleeve in normal unexpanded condition has a radius smaller than the radius of the inner periphery of said hub sleeve 11.

In the construction of Figs. 4 to 6, the radius of curvature of the brake sleeve segments may be made larger than that of the bore of the hub sleeve 11. In Fig. 6a, the segments of brake sleeve 18 are shown spaced from the inner periphery of the hub sleeve 11 before the application of the brake. Upon movement of the cone members 14 and 17 axially towards each other, these cones engaging the projections 24 expand these segments outwardly until the circumferential ends of these segments contact the inner periphery of the hub sleeve 11, while the vertex section of each segment is spaced inwardly from the inner periphery of said hub sleeve as shown in Fig. 6b. The sections of each brake sleeve segment beyond the projection 24 are sufficiently resilient, so that upon further axial movement of the cone members 14 and 17 towards each other, the circumferential ends of the brake sleeve segments contacting the inner periphery of the hub shell 11 are moved inwardly, while the vertex section is moved into conforming contact with said inner periphery as shown in Fig. 6c.

In both forms of construction, the portions of the brake sleeve between the projections are made resilient enough so that they will flex into conforming contact with the inner periphery of the hub 11. This construction not only serves to afford an effective and efficient braking action between the brake sleeve 18 and the hub 11, but also reduces the extent of contact and therefore the friction between the cones 14 and 17 and the sleeve 18, so that after braking operation, the segments of the sleeve may easily slide circumferentially and axially relative to said cones.

The parts of the brake sleeve may also be used in a larger number than two. The employment of even or nearly even wedge faces has the advantage, that the jaws also may swingably adjust themselves in a lateral direction upon the wedge faces and, therefore, their edges also may exert a sufficient brake pressure. The projections 23 and the recesses 25 may be used as desired in both constructions.

The new arrangement also may be used in connection with brake sleeves of other constructions, for instance brake sleeves having a brake jacket consisting of brake material and surrounding the jaws.

I claim:

1. In a hub brake for a bicycle, the combination comprising a wheel hub, a substantially cylindrical brake body non-rotatably mounted within said hub, cones extending into the ends of said brake body and relatively shiftable axially, said brake body having radially inwardly extending projections on its inner periphery riding on said cones, whereby relative axial movement of said cones will expand said brake body towards said hub, the circumferential sections of said brake body between said projections being sufficiently resilient to flex said brake body into conforming contact with the inner periphery of said hub during expansion of said brake body.

2. In a hub brake for a bicycle, the combination comprising a wheel hub, a substantially cylindrical brake body non-rotatably mounted within said hub, cones extending into the ends of said brake body and relatively shiftable axially, said brake body having radially inwardly extending projections on its inner periphery presenting inner peripheral surfaces inclined to substantially conform with the outer peripheral surfaces of said cones and riding on said cones, whereby relative axial movement of said cones will expand said brake body towards said hub, certain circumferential sections of said brake body on the sides of said projections being sufficiently resilient, so that if said brake body is of such diameter as to cause contact of said sections with said hub during expansion of said brake body and before other circumferential parts of said brake body effect contact with said hub, said sections will be flexed to move said parts into peripheral contact with said hub.

3. In a coaster brake for a bicycle, the combination comprising a wheel hub, a brake sleeve non-rotatably mounted within said hub, and including a plurality of radially expansible segmental sections, spring means for yieldably holding said segmental sections against expansion, cones extending into the ends of said sleeve and relatively shiftable axially for expanding said brake sleeve, said sleeve having at its ends projections extending radially inwardly from its inner periphery, and slidably supported on said cones, and means for effecting relative axial movement of said cones to expand said sleeve towards said hub, the circumferential sections of said sleeve between said projections being sufficiently resilient to bend into conforming engagement with the inner periphery of said hub upon expansion of said sleeve.

4. In a hub brake for a bicycle, the combination comprising a wheel hub, a brake sleeve non-rotatably mounted within said hub, and including a plurality of radially expansible segmental sections, cones extending into the ends of said sleeve and relatively shiftable axially, each of said sections having near each end on its inner periphery a pair of radially inwardly extending projections circumferentially spaced from the vertex of said section and riding on said cones, whereby relative axial movement of said cones will expand said sleeve towards said hub, the circumferential section of said sleeve between said projections being sufficiently resilient to bend said circumferential section outwardly after initial contact of said latter section with said hub and during expansion of said sleeve, whereby the circumferential portions of said segmental sections beyond said circumferential section are moved outwardly into conforming contact with the inner periphery of said hub.

5. In a hub brake for a bicycle, the combination comprising a wheel hub, a brake sleeve non-rotatably mounted within said hub, and including a plurality of radially expansible segmental sections, cones extending into the ends of said sleeve and relatively shiftable axially, each of said sections having near each end on its inner periphery a radially inwardly extending projection disposed at the vertex of said section and riding on a corresponding cone, whereby relative axial movement of said cones will expand said sleeve towards said hub, the circumferential sections of said sleeve beyond said projections being sufficiently resilient to bend inwardly, whereby said sleeve is bent into conforming contact with the inner periphery of said hub during expansion.

6. In a hub brake for a bicycle, the combination comprising a wheel hub, a substantially cylindrical brake body non-rotatably mounted within said hub, cones extending into the ends of said brake body and relatively shiftable axially, said brake body having radially inwardly extending projections on its inner periphery riding on said cones, whereby relatively axial movement of said cones will expand said brake body towards said hub, each of said projections contacting its corresponding cone only along a generatrix line of said cone to permit easy relative slide movement of said projections and said cones, the circumferential sections of said brake body between said projections being sufficiently resilient to flex said brake body into conforming contact with the inner periphery of said hub during expansion of said brake body.

ALFRED LESAGE.